Feb. 22, 1944. W. W. ELLIOTT 2,342,610
HANDPIECE
Filed Nov. 1, 1940
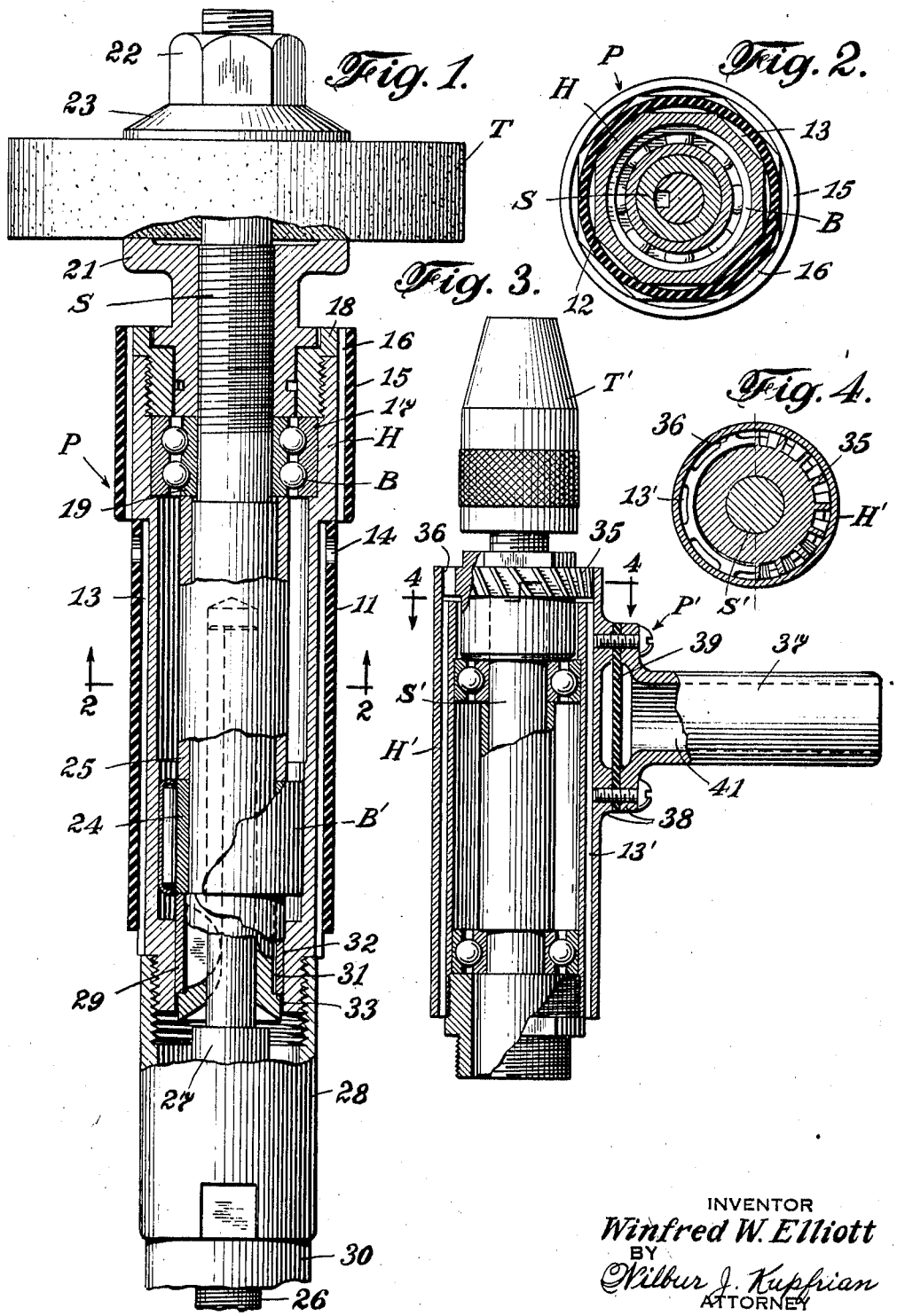
INVENTOR
Winfred W. Elliott
BY
Wilbur J. Kupfrian
ATTORNEY Patented Feb. 22, 1944

2,342,610

UNITED STATES PATENT OFFICE 2,342,610

HANDPIECE

Winfred W. Elliott, Johnson City, N. Y., assignor to Elliott Manufacturing Co., Binghamton, N. Y.

Application November 1, 1940, Serial No. 363,916

13 Claims. (Cl. 308—76)

This invention relates to portable tools, and more especially to handle members for rotatably mounting manually-held tools such as rotary grinders, drill collets, and the like.

Handpieces are applied particularly in connection with flexible shafting transmission systems wherein a motor or engine secured to a stationary or wheel-supported base operates a portable tool connected to the prime-mover by means of a flexible shaft, cable, or core, rotated within a flexible protective case. The rotating flexible shaft may operate metal-working and wood-working tools such as cutting, grinding, and hammering implements, or the shaft may operate miscellaneous appliances such as concrete vibrators, wrenches, and the like. The principles of the improved handpiece construction are also applicable in connection with other portable tools such as those rigidly connected to the shaft of light-weight portable motors and turbines.

It is well known that the operating efficiency of certain tools, such as grinding and cutting wheels, increases with the angular velocity of the tool. However, the use of higher-velocity prime movers for driving such portable tools has resulted in a marked increase in the heating effect caused by bearing friction. The overheating becomes especially noticeable within small diameter handpieces because of the rapid travel of the bearings in the bearing races and because of the limited radiation space for dissipating the heat. Radiation of heat from the handpiece is further restricted by the fact that the operator's hands substantially completely enclose the handpiece. Contrary to the natural supposition, the heating effect also is increased by the admission within the handpiece of grease from the lubricant-packed case of the flexible-shaft or core, due largely to the churning action that occurs at high speeds. Ordinarily, when a flexible shaft turns within its case, the outside winding acts as a screw conveyor, forcing the grease in the case forwardly under sufficient pressure to cause it to enter the handpiece, even though packing glands are employed to oppose such flow.

After a period of operation, the foregoing factors contribute to raise the temperature of the handpiece usually to a point at which the handpiece becomes unbearably hot to the operator. I have found that by properly designing the handpiece, the temperature of the outside portion may be reduced to a point comfortable to the operator without causing the bearings and other internal parts to heat up excessively.

The objects of the present invention are: to provide an improved handpiece for portable tools; to provide an improved handpiece for rotatably supporting a tool-supporting spindle, and to provide means for thermally insulating the external portion of such handpiece from the heat generated by the rotating spindle; to provide a ventilated handle for rotatable tools; to provide in a handpiece means for minimizing the heating effect of a rotating spindle by inhibiting the flow of grease or other lubricant to within such handpiece; to provide means for circulating a cooling fluid adjacent to the outer portion of a handpiece and in the region of the rotating tool; and to provide a handpiece having an auxiliary handle insulated from the main portion of the handpiece. These and other objects of the present invention will become more readily apparent from the following description and the accompanying drawing disclosing illustrative types of construction embodying the principles of the present invention. In the drawing:

Fig. 1 is a longitudinal sectional view partly in elevation of an improved handpiece incorporating features of the present invention;

Fig. 2 is a cross-sectional view taken on the line 2—2 of Fig. 1;

Fig. 3 is a vertical sectional view of a modified handpiece with fan-blade attachment; and, Fig. 4 is a cross-sectional view taken on the line 4—4 of Fig. 3.

Generally speaking, the invention comprehends providing a shell for the handpiece of ventilated and insulated construction so as to retard the flow of heat from the bearings to the outer portions of the handpiece. Where zones or passages are provided between an outside casing of the handpiece and an inner housing of the shell, means may be provided to encourage the flow of cooling fluid such as atmospheric air between the handpiece casing and the housing. Use may be made of an improved sealing ring for excluding grease and other lubricant from the handpiece.

Referring now in greater detail to Figs. 1 and 2, an improved form of handpiece P comprises a tubular housing H of steel, copper or other suitable metal, within which extends a power delivering member such as an oscillatable mandrel or rotatable spindle S mounted for movement relatively to the housing. The housing is substantially enclosed within a tubular casing 11 preferably formed of non-metallic substantially rigid material capable of thermally insulating the housing while providing a comfortable covering when the handpiece is grasped within the hands of an operator. Successful use has been made of fiber tubes, and tubes made of synthetic amorphous compositions such as phenol condensation products, vinyl resins, and the like; otherwise the casing 11 may comprise a metal tube integral with the housing H to form a unitary shell, or may be separate from the tubular housing H, but preferably covered with non-metallic insulating material such as cork, fabric or the like.

The casing covers the housing in such a way as preferably to form a plurality of intervening air zones or spaces beneath the casing so as to provide better thermal insulation. The air spaces may be formed by providing separator means or standoffs such as longitudinally or helically extending wires located along the periphery of the housing H, capable of holding the casing in separated relation to the outer portion of the housing. Otherwise, the separator means may comprise the walls of numerous cavities or pits formed in the periphery of the housing to provide small air pockets. Preferably, however, use is made of a tubular casing and a generally tubular housing having dissimilar contours in cross-section throughout their entire length, so as to provide a number of longitudinally extending passages along the handpiece beneath the casing.

As shown in Fig. 2 the foregoing preferred arrangement may be practiced successfully by employing a substantially cylindrical tube of insulating material for enclosing a metallic tubular housing having a polygonal outer periphery. The apices or raised dwells 12 of the polygonal periphery act as separators to form a plurality of juxtaposed elongated passages or flutings 13 extending longitudinally of the handpiece between the housing and the casing at spaced points about the periphery. The tubular casing 11 centers itself about the housing during assembly and by providing a cylindrical tube with an inner circumference slightly smaller than required to circumscribe the polygonal outer periphery of the housing, the cylindrical tube becomes distorted slightly when in assembled position and provides frictional engagement to hold the two parts firmly together.

The longitudinal passages preferably extend from one end of the casing to the other and communicate with the atmosphere at opposite ends, as shown in Fig. 1. The passages 13 open to the atmosphere at the lower or rear portion of the casing 11 and communicate with the atmosphere at the upper end thereof through ducts 14. In the form of the invention shown in Fig. 1, the upper or forward part of the handpiece is enlarged to accommodate ball bearings, and the enlarged portion is provided with a sleeve 15 preferably of the same material as the casing 11. The sleeve 15 cooperates with the polygonal faces of the portion beneath the sleeve to form supplementary passages 16 but it is to be understood that where the configuration of the handpiece permits, a single insulating tubular casing is employed and a single set of passages formed from one extremity of the handpiece to the other. Even where the handpiece is provided with an enlarged forward portion, as shown in Fig. 1, the passages 13 and 16 may be joined and the tubular casing 11 may be united with the sleeve 15 to form a continuous tubular covering.

The polygonal faces on the housing H may be of any desired configuration, for example, plane, concave, or convex. Use is made preferably of a regular polygon having an even number of plane surfaces, as shown in Fig. 2, as this arrangement provides for the formation of wide, shallow passages 13, 16 affording the maximum degree of heat exchange between the parts. Also, when the polygonal housing has an even number of faces, it may be made to project at one end an appreciable distance behind the end of the tubular casing 11 to expose the faces of the polygonal periphery for cooperation with a wrench or similar tool when the operator connects or disconnects the front ferrule of the flexible shaft case.

With the longitudinal passages 13 and 16 formed as shown in Figs. 1 and 2, the temperature of the outer portion of the handpiece P is materially reduced. I have found that handpieces incorporating the present design principles operate at considerably lower temperatures than handpieces of ordinary design, as a result of comparative tests made under the same working conditions. The present handpiece benefits in two ways from the improved casing structure: the air zones beneath the casing insulate the same from the housing, and the natural circulation of air through the passages dissipates a considerable portion of the engendered heat and at the same time provides a cushion of cool air directly beneath the periphery of the tubular casing 11.

The spindle S extends axially through the housing H and is provided with front bearing B and rear bearings B' of any conventional design. The outer race 17 of the front bearing B is locked within the housing by means of a lock nut 18 and the inner race 19 is locked to the spindle S by spindle nut 21, the forward portion of which is flanged to cooperate with the forwardly projecting portion of the spindle S to receive a suitable tool such as a grinding wheel T. A nut 22 and washer 23 provide additional tool mounting means at the extreme forward end at the spindle S.

The rear bearing B' is disclosed as a needle bearing but may otherwise be of any conventional construction, the inner race 24 of which is held in separated relation to the front bearing B by a spacer 25. Both bearings are isolated from the passages 13 and 16 and from the atmosphere, and hence are protected against dirt and other foreign material; the passages hence may not become obstructed by lubricant and other material from the bearing because the passages are isolated from the bearings. The rear portion of the spindle S is bored to provide flexible shaft connecting means. A flexible shaft or core 26 may be connected to the spindle by means of a shaft or core fitting 27 splined or otherwise secured to the spindle in any convenient manner.

The rear portion of the handpiece P is provided with means for tightly connecting thereto a swivelled and threaded ferrule 28 forming the terminal member of a flexible shaft case 30, which case preferably contains grease or other lubricant to minimize heating therein.

The tendency toward heating of the handpiece may be minimized additionally by providing one or more grease-excluding rings 29 of bronze, Micarta, or the like, adjacent to the ferrule attaching means at the rear portion of the handpiece P. Each ring 29 is located within the shell or housing H at the rear portion thereof and comprises a collar having an inner peripheral portion loosely engaging an annular groove 31 in the spindle S at the shaft-connecting end, and an outer peripheral portion forming a smooth running fit with the adjoining inner annular portion 32 of the housing H. The groove 31 is formed by a flange 33 at the end of the spindle and the end of the inner race 24 of the rear bearing B'. If the groove 31 is formed entirely within the spindle S, as by turning an annular channel therein, the ring 29 may be assembled within the groove or by shrinking the same in place, or if more than one ring 29 is employed, they may be split to facilitate assembly. The ends of the collar or ring 29 engage the ends of the groove 31 to form a running fit therewith. Accordingly, the ring 29 effectively inhibits the flow of grease from the case 30 to within the handpiece P, as the lubricant must follow a circuitous path beneath the ring in order to enter the housing H and this is generally precluded by the smooth fit of the ends of the ring with the groove, and by the presence of a thin annulus of grease beneath the ring 29. The annular space beneath the ring 29 provides for self alignment of the parts and minimizes wear. Because of the close fit between the outer periphery of the ring 29 and the adjoining inner annular portion 32, the grease does not follow a path between the two parts.

In the modified form of handpiece P' shown in Figs. 3 and 4, the entire shell may be made of a unitary tubular housing H' preferably of molded plastic material or extruded metal, having spaced longitudinal passages 13' therethrough adjacent to the periphery for the circulation of cooling fluid through the handpiece. Impeller means such as a rotary fan blade 35 may be used to promote the flow of cooling fluid through the peripherally disposed longitudinal passages. The fan blade 35, which may be rotated by the spindle S' preferably is located within an annular chamber 36 enclosed by the housing H', for example, at the forward end of the passages 13', so as to draw air through the passages and project it forwardly adjacent to the tool T'. Besides promoting the cooling action, the fan blade 35 provides a current of air adjacent to the tool of sufficient intensity to clear the work of loose filings, or drillings, and the like, produced by the tool during operation. If the cooling fluid comprises liquid admitted at the rear of the handpiece under pressure, such fluid may be discharged adjacent to the tool, with or without the assistance of an impeller, and may be conducted to a point at which it may discharge against the tool, as the end of a drill or the edge of a grinding wheel, to assist the operation of the tool.

An auxiliary or stand-off handle 37 projects angularly from the housing H' and preferably is supported by stand-off members 38 of reduced cross-sectional area to minimize heat flow from the housing to the handle 37. An auxiliary handle 37 of the type shown is especially useful in connection with angle heads or conventional handpieces that are not provided with the improved cooling means herein disclosed. Heat flow is additionally reduced by interposing a sheet or layer of thermal insulating material 39 between the two parts. The handle 37 comprises an elongated post, having an air duct 41 extending longitudinally between its ends. The natural circulation of air through the post assists in maintaining the parts cool.

The invention herein disclosed may be modified appreciably without departing from the scope of the invention or sacrificing its advantages. Although the improved structure has been shown applied to a typical handpiece for purposes of illustration, it is to be understood that underlying principles are equally well applicable to other tool handles such as angle heads, outboard handles, and the like.

I claim:
1. A flexible shaft handpiece comprising a tubular housing; a power-delivering member extending through said housing and movable by said flexible shaft relatively to said housing; and a generally tubular casing outside of said housing and being thermally insulated from said housing, said casing substantially enclosing said housing from one end to the other but being substantially completely separated therefrom by an intervening substantially annular zone of air extending between said casing and said housing.

2. A handpiece for manually-held portable tools comprising a housing; a rotatable spindle journalled within said housing and being adapted to drive a portable tool; and a generally cylindrical tube encasing said housing; said housing comprising a hollow elongated body of metal having a polygonal outer periphery adapted to engage said tube at spaced points about the inner periphery of said tube to provide air passages between said tube and said housing.

3. A handpiece as claimed in claim 2 wherein said housing projects at one end an appreciable distance beyond said tube, to expose the faces of said polygonal periphery.

4. A handpiece as claimed in claim 2 wherein said tube is formed of non-metallic substantially rigid material, said cylindrical tube having an inner circumference slightly smaller than required to circumscribe said polygonal outer periphery, said cylindrical tube thereby being distorted slightly at spaced zones about its periphery when in assembled position to provide frictional engagement between said tube and said periphery.

5. A handpiece for manually-held rotatable tools comprising an elongated hollow housing; a rotatable spindle extending through and journalled within said housing; a tubular casing of thermal insulating material substantially enclosing said housing, the outer periphery of said housing and the inner periphery of said tubular casing being of dissimilar contour, to provide peripherally spaced flutings located between said housing and said tubular casing.

6. A handpiece as claimed in claim 5 wherein said flutings communicate with the atmosphere at opposite ends of said casing.

7. A handpiece for rotatable tools, said handpiece comprising a generally tubular shell; a rotatable tool-supporting spindle journalled within said shell and being provided at its forward end with tool-mounting means adapted to receive a rotatable tool; said shell being provided with annularly disposed air passage means extending longitudinally of said handpiece adjacent to the outer periphery of said tubular housing and isolated from said spindle, said passage means terminating adjacent to the forward and rearward ends of said handpiece; and a fan blade within said shell adjacent to the forward terminals of said passage means, said blade being rotatable by said spindle and being adapted to draw air from the rearward end through said passage means free from communication with said rotatable spindle and to project such air forwardly adjacent to said tool.

8. A handpiece for manually-supported rotatable tools, said handpiece comprising a generally tubular housing; a rotatable tool-supporting spindle within said bearings for journalling said spindle to said housing; a stand-off handle secured at one end adjacent to said housing and projecting angularly therefrom; and means for counteracting the flow of heat from said bearings to the exterior of said housing and to said stand-off handle comprising air passages extending longitudinally through said housing, and a layer of thermal insulating material separating said end of said stand-off handle from said housing.

9. In a handpiece for manually-supported rotatable tools, the combination comprising a tubular housing; a rotatable tool-supporting spindle journalled within said housing; and a stand-off handle, comprising an elongated post having a longitudinal air duct extending therethrough and being vented to the atmosphere at opposite ends, and stand-off members of reduced cross-sectional area adapted to secure said post at substantially right angles to said tubular housing.

10. Combination as claimed in claim 9, including a layer of thermal insulating material between said housing and said post.

11. A handpiece for rotatable tools comprising a tubular metallic shell; a spindle extending within said shell; bearings within said shell adapted to rotatably support said spindle; said spindle being provided at one end with tool-mounting means and at the opposite end with flexible-shaft connecting means; a generally tubular casing of insulating material surrounding said shell and forming with said shell longitudinally extending passages open at each end and adapted to circulate cooling air; said shell being formed at one end with attaching means for securing thereto a flexible-shaft case containing grease or other lubricant; and a grease-excluding ring within said shell adjacent to said attaching means adapted to inhibit the flow of grease from said flexible-shaft case to within said shell, comprising a collar having an inner peripheral portion loosely engaging an annular groove formed in said spindle at the shaft-connecting end thereof, and having end portions forming a running fit with the ends of said groove, said collar having an outer peripheral portion forming a smooth running fit with the adjoining inner annular portion of said shell.

12. In a handpiece for rotatable tools, wherein a tubular housing rotatably supports a tool-supporting spindle, and wherein said spindle and housing are adapted to connect at one end with a flexible-shaft and lubricant-containing shaft case respectively, means for inhibiting the passage of lubricant from said case to said housing, said means comprising an inner peripheral zone in said housing and an adjacent annular groove-like portion in said spindle, both adjacent to said end of said housing, and a collar lying loosely in said groove-like portion annular space, the outer periphery of said collar smoothly engaging said inner peripheral zone, the ends of said collar engaging the ends of said groove-like portion.

13. A handpiece for portable tools comprising a housing; a rotatable tool-driving spindle extending through and substantially completely enclosed by said housing, said spindle being journalled at opposite ends within said housing; a generally tubular member of thermal insulating material for thermally insulating said housing, said member generally covering said housing and being adapted to be held within the hands of an operator; and separator means for supporting portions of said member in separated relation to said housing to provide intervening spaces for the circulation of air between said housing and said member.

WINFRED W. ELLIOTT.